(12) United States Patent
Miyata et al.

(10) Patent No.: US 9,650,304 B2
(45) Date of Patent: May 16, 2017

(54) TUNNEL KILN FOR FIRING CERAMIC POROUS BODIES

(71) Applicant: NGK Insulators, Ltd., Nagoya-shi, Aichi-Prefecture (JP)

(72) Inventors: Jotaro Miyata, Komaki (JP); Chikashi Ihara, Nagoya (JP); Takashi Yasue, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 643 days.

(21) Appl. No.: 14/022,692

(22) Filed: Sep. 10, 2013

(65) Prior Publication Data

US 2014/0011150 A1 Jan. 9, 2014

Related U.S. Application Data (63) Continuation of application No. PCT/JP2012/056676, filed on Mar. 15, 2012.

(30) Foreign Application Priority Data

Mar. 18, 2011 (JP) ................. 2011-060643

(51) Int. Cl.
  *C04B 38/06* (2006.01)
  *F27B 9/20* (2006.01)
  (Continued)

(52) U.S. Cl.
  CPC .............. *C04B 38/06* (2013.01); *C04B 33/32* (2013.01); *C04B 35/638* (2013.01); *C04B 35/64* (2013.01);
  (Continued)

(58) Field of Classification Search
  USPC ........................................ 432/133, 152, 187
  See application file for complete search history.

(56) References Cited

U.S. PATENT DOCUMENTS 2,310,578 A * 2/1943 Fessler ................... F27B 9/262
  264/652
5,417,198 A * 5/1995 Williams ................. A21B 1/02
  126/21 A
(Continued)

FOREIGN PATENT DOCUMENTS

CN 1280664 A 1/2001
CN 1882518 A 12/2006
(Continued)

OTHER PUBLICATIONS

Machine translation of patent # DE 3923887A1—German version supplied by Applicant.*

(Continued)

*Primary Examiner* — Alissa Tompkins
*Assistant Examiner* — John Bargero
(74) *Attorney, Agent, or Firm* — Burr & Brown, PLLC (57) ABSTRACT

The invention provides a tunnel kiln for firing ceramic porous bodies which can fire ceramic porous bodies containing organic binders in a shorter period of time than in conventional methods without producing breaks or requiring nitrogen gas. The tunnel kiln includes a preheating zone 1, a firing zone 2, and a cooling zone 3 and fires the ceramic porous bodies loaded on a carriage 7 by driving it in a furnace. A heat storage regenerative burner 10 is used as means of heating the firing zone 2 so that low-oxygen-concentration exhaust gas discharged from the heat storage regenerative burner 10 may be returned to an exhaust gas return line 14 and supplied into the preheating zone 1. The exhaust gas return line 14 may be provided with a combustion device 17 that reduces the oxygen concentration by consuming oxygen contained in the exhaust gas.

12 Claims, 7 Drawing Sheets

(51) Int. Cl.
    *F27B 9/26*     (2006.01)
    *F27B 9/36*     (2006.01)
    *F27D 99/00*     (2010.01)
    *C04B 33/32*     (2006.01)
    *C04B 35/64*     (2006.01)
    *C04B 35/638*     (2006.01)

(52) U.S. Cl.
    CPC .................. *F27B 9/20* (2013.01); *F27B 9/26* (2013.01); *F27B 9/262* (2013.01); *F27B 9/36* (2013.01); *F27D 99/0033* (2013.01); *C04B 2235/6584* (2013.01); *F23G 2900/54001* (2013.01); *Y02P 40/65* (2015.11)

(56) References Cited

U.S. PATENT DOCUMENTS

| | | | |
|---|---|---|---|
| 6,048,199 | A | 4/2000 | Dull et al. |
| 6,089,860 | A | 7/2000 | Dull et al. |
| 6,325,963 | B1 | 12/2001 | Dull et al. |
| 6,644,962 | B2 | 11/2003 | Sugimoto et al. |
| 2002/0003322 | A1* | 1/2002 | Dull .................. C04B 35/195 264/630 |
| 2003/0027095 | A1 | 2/2003 | Sugimoto et al. |
| 2007/0054229 | A1 | 3/2007 | Hanzawa et al. |
| 2010/0213647 | A1 | 8/2010 | Buchet et al. |

FOREIGN PATENT DOCUMENTS

| | | |
|---|---|---|
| DE | 39 23 887 A1 | 1/1991 |
| EP | 1 275 740 A1 | 1/2003 |
| FR | 2 916 764 A1 | 12/2008 |
| JP | 55-144474 | 11/1980 |
| JP | 2000-205754 | 7/2000 |
| JP | 2001-525531 | 12/2001 |
| JP | 2001-527202 | 12/2001 |
| JP | 2007-1843 | 1/2007 |
| WO | 2005/047207 | 5/2005 |

OTHER PUBLICATIONS

International Search Report, International Application No. PCT/JP2012/056676, dated Jun. 19, 2012 (4 pages).
European Office Action (Application No. 12761478.2) dated Jul. 15, 2015.
Chinese Office Action, Chinese Application No. 201280009860.0, dated Aug. 21, 2014 (6 pages).
Extended European Search Report (Application No. 12761478.2) dated Jul. 23, 2014.

* cited by examiner

TUNNEL KILN FOR FIRING CERAMIC POROUS BODIES

BACKGROUND OF THE INVENTION

1. Field of the Invention

The invention relates to a tunnel kiln for firing ceramic porous bodies containing organic binders, and more specifically to a carriage type tunnel kiln suitable for firing a ceramic honeycomb structures.

2. Description of Related Art

In a tunnel furnace for firing ceramic porous bodies containing organic binders such as ceramic honeycomb structures, its preheating zone is subject to generation of a large amount of organic binder gases. Conventionally, the organic binder gases are burned at a high air ratio by using high-speed burners capable of giving high-velocity flame to supply the preheating zone with a large amount of combustion gas in order to enhance the effect of stirring so that the temperature distribution may be kept well. Besides, a circulation fan has been fitted to the preheating zone to improve the effect of stirring. The technology for homogenizing the in-furnace temperature distribution is available, however still there is a problem that productivity cannot easily be improved because binder releasing process in the preheating zone takes a long time. The reasons are as follows.

That is, since an organic binder gases generating in the preheating zone burns on the surface of a ceramic porous body, its periphery is heated to a high temperature, whereas its inside stays at a comparatively low temperature because of its excellent thermal insulation properties. Subsequently, as the temperature of the inside of the ceramic porous body rises, combustion of the organic binder gases go on to heat the inside to a high temperature, whereas the temperature of the periphery does not readily rise because of the excellent thermal insulation properties of the ceramic porous body. For this reason, a difference in temperature may occur between the inside and the periphery during a binder releasing process, leading to the occurrence of cracks referred to as breaks due to thermal stress.

Conventionally, to avoid the problem, the progress of the binder releasing process is moderated by elongating the preheating zone and slowing down the traveling speed of a carriage.

Patent Documents 1 and 2 disclose a tunnel furnace that suppresses combustion of organic binders by supplying nitrogen gas etc. to a preheating zone to decrease an oxygen concentration in an atmosphere and thereby complete releasing of binder in a short period of time. However, this requires a large amount of nitrogen gas, leading to a problem of higher running costs. There is also another problem that the tunnel furnace is subject to entry of fresh air when a carriage is being carried in. Consequently, is difficult to keep the oxygen concentration in the preheating zone at a level of 8% or less, or preferably 5% or less at which the breaks never occur as described above. For those reasons actually the temperature is allowed to rise gradually over a long period of time in order to prevent breaks from occurring in the binder releasing process.

PRIOR ART TECHNOLOGICAL LITERATURE

Patent Documents

Patent Document 1: JP 2001-527202 W
Patent Document 2: JP 2001-525531 W

SUMMARY OF THE INVENTION

Problem to be Solved by the Invention

In view of the above, it is an object of the invention to solve the conventional problems and provide a tunnel kiln for firing ceramic porous bodies that can fire ceramic porous bodies containing organic binders in a shorter period of time than in conventional methods without producing breaks or requiring nitrogen gas.

Means for Solving Problems

To solve the problems, the invention provides a tunnel kiln for firing ceramic porous bodies which includes a preheating zone, a firing zone, and a cooling zone and fires ceramic porous bodies loaded on a carriage and traveling in a furnace and in which a heat storage regenerative burners are used as means of heating the firing zone and an exhaust gas return line for supplying a low-oxygen-concentration exhaust gas discharged from the heat storage regenerative burners into the preheating zone is provided so that the preheating zone may be a low-oxygen atmosphere.

It is preferable to provide a configuration in which a spare chamber is formed at the stage preceding the preheating zone in order supply, into the spare chamber, the low-oxygen-concentration exhaust gas discharged from the heat storage regenerative burners.

It is preferable to provide a configuration in which the exhaust gas return line is provided with a combustion device that consumes oxygen contained in the exhaust gas to lower an oxygen concentration, a configuration in which a path is provided which suctions in-furnace gas from the preheating zone and meets the exhaust gas return line and which is fitted with the combustion device that consumes oxygen contained in the in-furnace gas in the preheating zone to lower the oxygen concentration, or a configuration in which a path is provided which sections in-furnace gas from the preheating zone and meets a stage preceding the combustion device, the combustion device being preferable to be a catalytic combustion device. It is more preferable to provide an afterburner to a path that suctions the in-furnace gas from the preheating zone and discharges it in order to completely burn organic binder gases occurring from the ceramic porous bodies and, at the same time, remove nitrogen oxide contained in the exhaust gas supplied from the exhaust gas return line.

Effects of the Invention

In a ceramic porous bodies firing tunnel kiln of the invention, low-oxygen-concentration exhaust gas discharged from heat storage regenerative burners serving as means to heat a firing zone is returned through an exhaust gas return line and supplied into a preheating zone. The heat storage regenerative burner has a configuration to recover sensible heat of gas suctioned from an inside of a furnace to a heat reservoir. Therefore, the exhaust gas is at a comparatively low temperature of about 250° C. to 300° C. even when the temperature for firing is in excess of 1400° C. The oxygen concentration is typically 3% to 7%, depending on the combustion conditions. According to the invention, it is possible to reduce the oxygen concentration in the preheating zone by supplying exhaust gas from the heat storage regenerative burner into the preheating zone, in order to inhibit combustion of organic binders in a binder releasing process and prevent breaks from occurring.

In a configuration according to claim 2 in which a spare chamber is formed at a stage preceding the preheating zone to supply the low-oxygen-concentration exhaust gas discharged from the heat storage regenerative burner also into the spare chamber, fresh air can be prevented from entering when a carriage is introduced into the preheating zone. This is advantageous in keeping the preheating zone in a low-oxygen atmosphere.

In a configuration according to claim 3 or 8, in which the exhaust gas return line is provided with a combustion device to reduce the oxygen concentration by consuming oxygen contained in the exhaust gas, the exhaust gas having a low oxygen concentration can be supplied to the preheating zone even if the oxygen concentration of the exhaust gas from the heat storage regenerative burner is in excess of a predetermined concentration.

In a case where a still larger amount of low-oxygen gas is necessary to keep the preheating zone at a low oxygen concentration, it is preferable, as in claim 4, 5 or 10, to provide a configuration in which gas with oxygen concentration lowered obtained by suctioning in-furnace gas from the preheating zone and consuming oxygen contained therein through combustion is returned to the preheating zone along with the low-oxygen-concentration exhaust gas discharged from the heat storage regenerative burner.

It is preferable, as in claim 6 or 10, to provide a configuration in which a catalytic combustion device is used as the combustion device because oxygen can be consumed by allowing a combustion reaction to progress even in a region where the temperature and the oxygen concentration are low.

In a configuration according to claim 7 in which the in-furnace gas is suctioned from the preheating zone and introduced to the afterburner to completely burn the organic binder gases generating from the ceramic porous bodies and, at the same time, remove nitrogen oxide contained in the exhaust gas supplied from the exhaust gas return line, non-catalytic denitration can be performed for protection of the environment.

DETAILED DESCRIPTION OF THE INVENTION

Embodiments of the invention will be described below.

Figure 1:
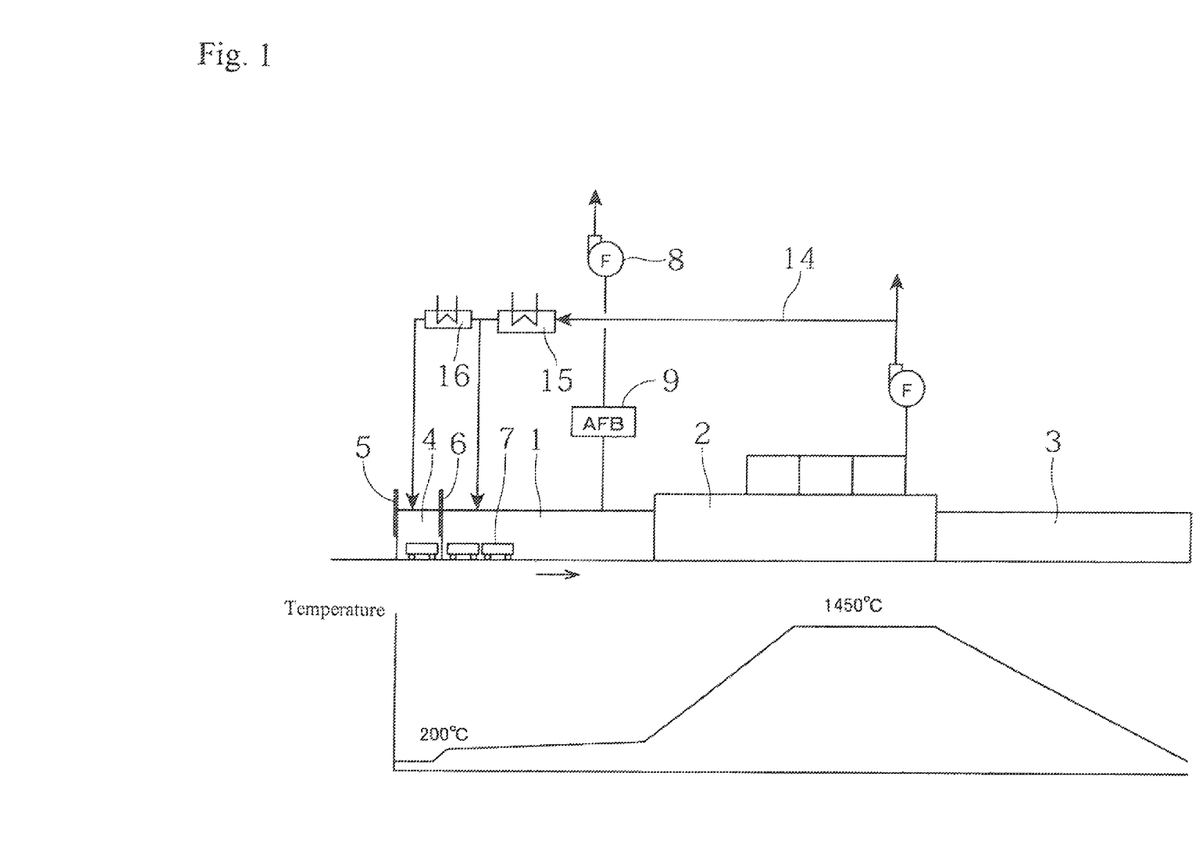
FIG. 1 an explanatory view of first embodiment of the invention.

FIG. 1 is an explanatory view of a first embodiment of the invention, in which numeral 1 indicates a preheating zone, numeral 2 indicates a firing zone, and numeral 3 indicates a cooling zone of a tunnel furnace. At a stage preceding the preheating zone, a spare chamber 4 is formed, and rise and fall doors 5 and 6 are mounted at the front and at the rear of the chamber 4, respectively. Fresh air can be prevented from entering by alternately opening and closing these doors.

Ceramic porous bodies containing organic binders to be fired travel rightward in FIG. 1 in condition where they are loaded on a carriage 7, during which they undergo releasing of binders at about 200° C. in the preheating zone 1, firing at 1400° C. to 1500° C. in the firing zone 2, and cooling to around the normal temperature in the cooling zone 4 and then are taken out. In the present embodiment, the ceramic porous bodies are cordierite ceramic honeycomb structures and contain methylcellulose or polyvinyl alcohol as the organic binder.

Figure 2:
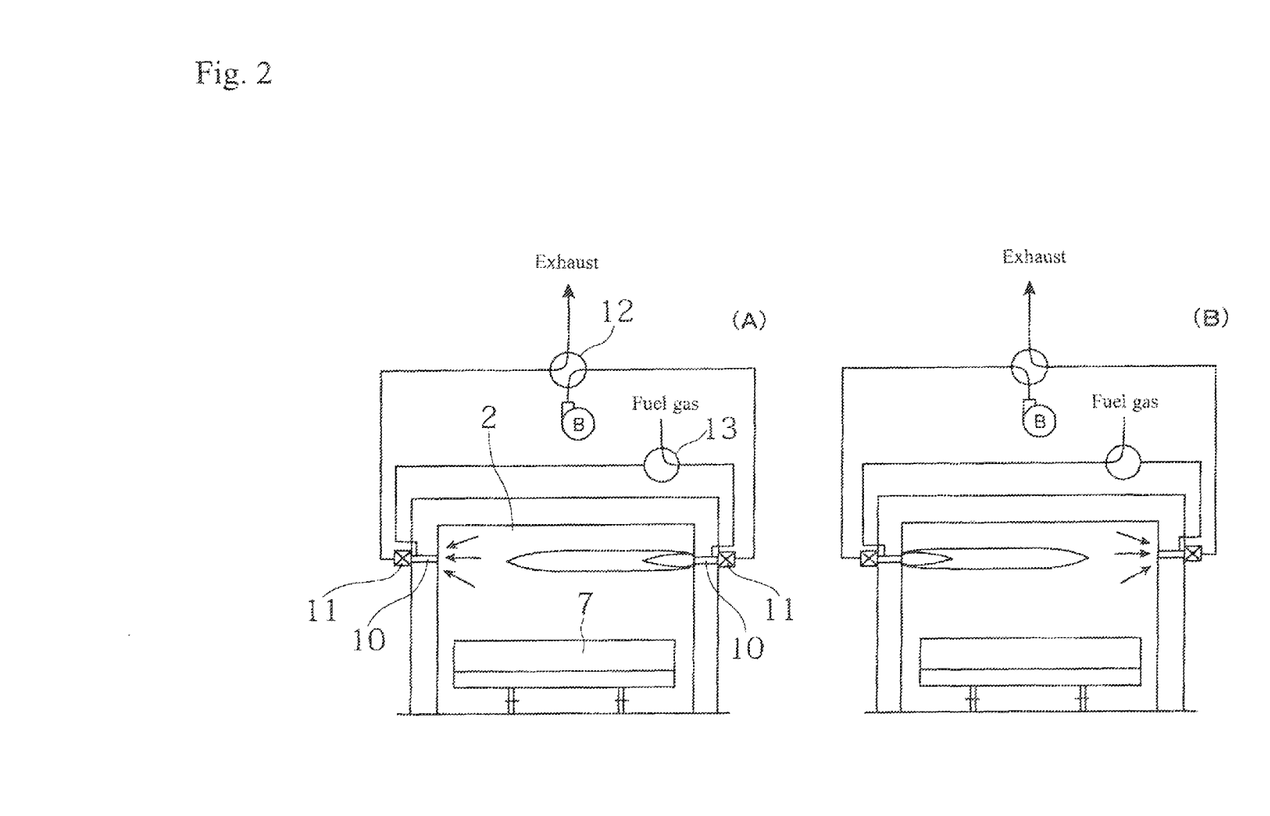
FIG. 2 is an explanatory view of a heat storage regenerative burner.

In the firing zone 2, heat storage regenerative burners 10 such as shown in FIG. 2 are provided as heating means. Typically, a pair of the storage regenerative burner 10, each of which includes a heat reservoir 11 along a flow path for combustion air, are placed to repeat combustion and exhaust in a short period of time of about 30 seconds. That is, in a state A in FIG. 2, the left-side heat storage regenerative burner 10 suctioned in the in-furnace gas, stores its heat in the heat reservoir 11, and exhausts it. The right-side heat storage regenerative burner 10 is ignited by being supplied with combustion air and fuel gas which are heated when passing through the heat reservoir 11. In a state B in FIG. 2, the left-side heat storage regenerative burner 10 is ignited and right-side heat storage regenerative burner 10 suctions the in-furnace gas. An air switching valve 12 and a fuel switching valve 13 are used to conduct switchover between the states A and B in a short period of time of about 30 seconds.

The heat storage regenerative burners 10 burn the in-furnace gas whose sensible heat has been removed when passing through the heat reservoir 11, and therefore the resultant exhaust gas has a temperature of about 250° C. to 300° C. The oxygen concentration of the exhaust gas is roughly in a range of about 3% and 7%, depending on the combustion conditions. As shown in FIG. 1, according to the invention, the exhaust gas from the heat storage regenerative burners 10 are returned to the preheating zone 1 through the exhaust gas return line 14. If the exhaust gas is too hot to be supplied into the preheating zone 1, heat removal equipment 15 is fitted to the exhaust gas return line 14 as shown in FIG. 1 to thereby cool the exhaust gas to about 200° C. and then supply it into the preheating zone 1. As the heat removal equipment 15, a heat exchanger can be used.

Since the preheating zone 1 is thus kept at a low oxygen concentration, in the binder releasing process going on in the preheating zone 1, combustion of the organic binder can be suppressed to prevent the occurrence of breaks. As a result, the traveling speed of the carriage 7 can be increased to finish the binder releasing process a short period of time.

In the tunnel kiln, it is necessary to push the carriage 7 into the furnace by using a pusher etc. and, at the same time, alternately open and close the rise and fall doors 5 and 6 at the entrance so that the atmosphere of the spare chamber 4 can preferably match that of the portion of the entrance of the preheating zone 1. Further, to protect a device such as the pusher, the spare chamber 4 should preferably be at a lower temperature beforehand. For this purpose, in FIG. 1, heat removal equipment 16 is disposed series with the heat removal equipment 15 to further lower the temperature of the exhaust gas and then supply it also into the spare chamber 4.

In the preheating zone 1, a large amount of organic binder gases generates from the ceramic porous bodies. Therefore, the in-furnace gas is suctioned from the preheating zone 1 by a suction fan 8, burned by an afterburner 9, and released to the atmosphere as harmless and odorless gas. This process will be more specifically described as follows.

That is, since the firing zone 2 of the tunnel kiln for firing ceramic porous bodies is at a high temperature, the concentration of nitrogen oxide (hereinafter abbreviated as NOx) becomes high. In the preheating zone 1, organic binder gas generates from the ceramic porous bodies and is mixed into exhaust gas containing NOx supplied from the exhaust gas return line 14. Then, the exhaust gas in the preheating zone 1 is heated by the afterburner 9 to a temperature of about 750° C. to 850° C., oxidized, and discharged from a chimney pipe. In this case, however, over the afterburner 9, since the organic binder gas acts as a reducing agent on NOx, the oxidation of the organic binder gas and the reduction of NOx take place simultaneously to produce $N_2$ and $CO_2$ as well as $H_2O$, which are then discharged. The gas can be denitrated without using a catalyst, though at a NOx removal efficiency of several tens of percent.

To improve the NOx removal efficiency, $NH_3$ may be supplied to the afterburner 9. Alternatively, the function of catalytic denitration may be given to a catalytic deodorizing furnace rather than the afterburner. That is, is also possible to inhibit energy consumption while actively denitrating the organic binder gas by using a Pt—Pd-based oxidation catalyst to oxidize the gas and place a Ti—V-based denitration catalyst at the preceding stage at a reaction temperature kept at 250° C. to 300° C.

Figure 6:
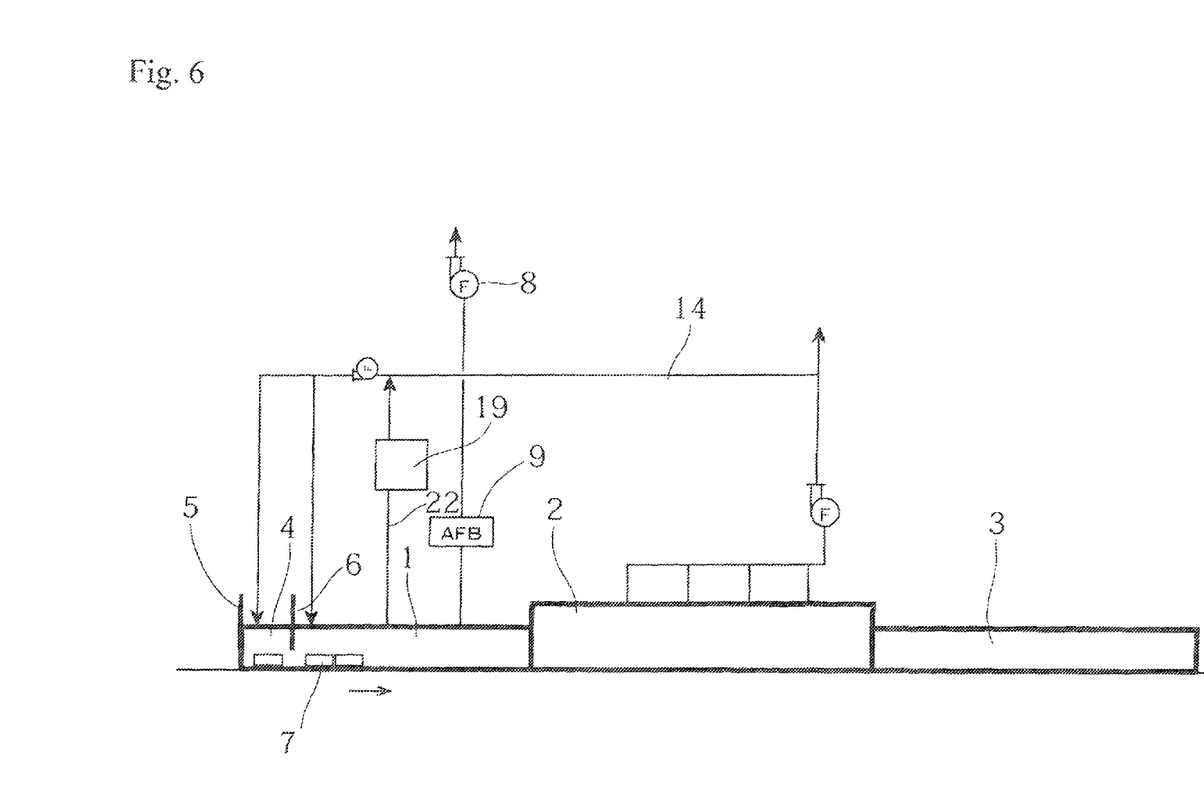
FIG. 6 is an explanatory view of a third embodiment of the invention.
Figure 7:
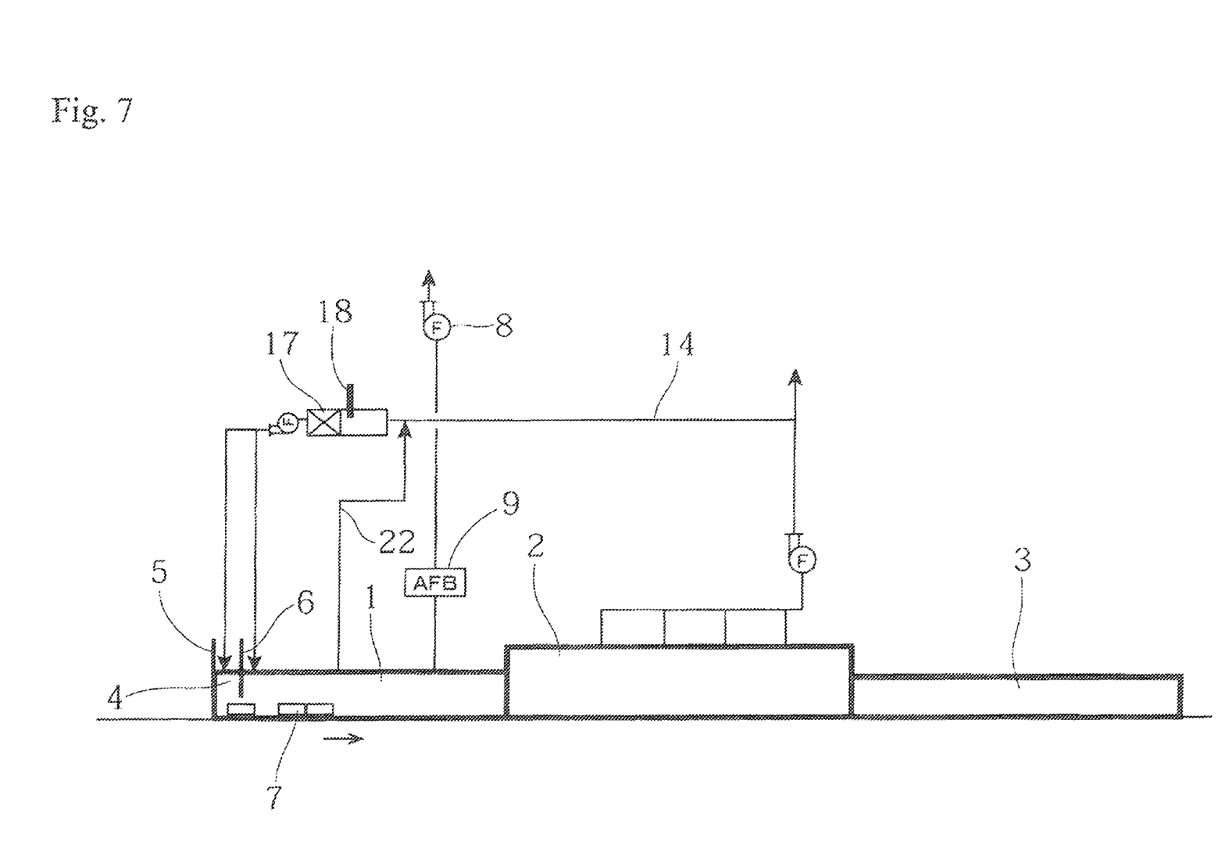
FIG. 7 an explanatory view of a fourth embodiment of the invention.

The amount of low-oxygen gas required to keep the preheating zone 1 to a low-oxygen concentration increases as the amount of the organic binder gas generating in the preheating zone 1 increases. If still more low-oxygen gas is required to keep the preheating zone 1 at the low-oxygen concentration while at the same time keeping the furnace pressure in the preheating zone 1 higher than the atmospheric pressure, a configuration such as shown in FIG. 6 can be employed in which an exhaust line 22 which suctions in-furnace gas in the preheating zone 1 and meets the exhaust gas return line 14 is provided to introduce part of this in-furnace gas drawn out from the preheating zone 1 to a combustion device 19 and burn it there and consume oxygen contained in the in-furnace gas and return the resultant oxygen-concentration lowered gas to the preheating zone 1 along with exhaust gas in the exhaust gas return line 14. The combustion device 19, which is preferably a catalytic reactor vessel, has a role of burning the organic binder gases contained in the in-furnace gas and a role of consuming oxygen in the in-furnace gas through the burning so that the oxygen concentration may lower. Further, unlike the afterburner placed before the position of the gas release to the atmosphere, the combustion device 19 need not burn the organic binder gases completely. The position where the combustion device 19 is placed is not limited in particular. The combustion device 19 may be placed on the downstream side of a position where the exhaust line 22 and the exhaust gas return line 14 meet as shown in FIG. 7, in which case it can be combined with a combustion device 17 described below.

Figure 3:
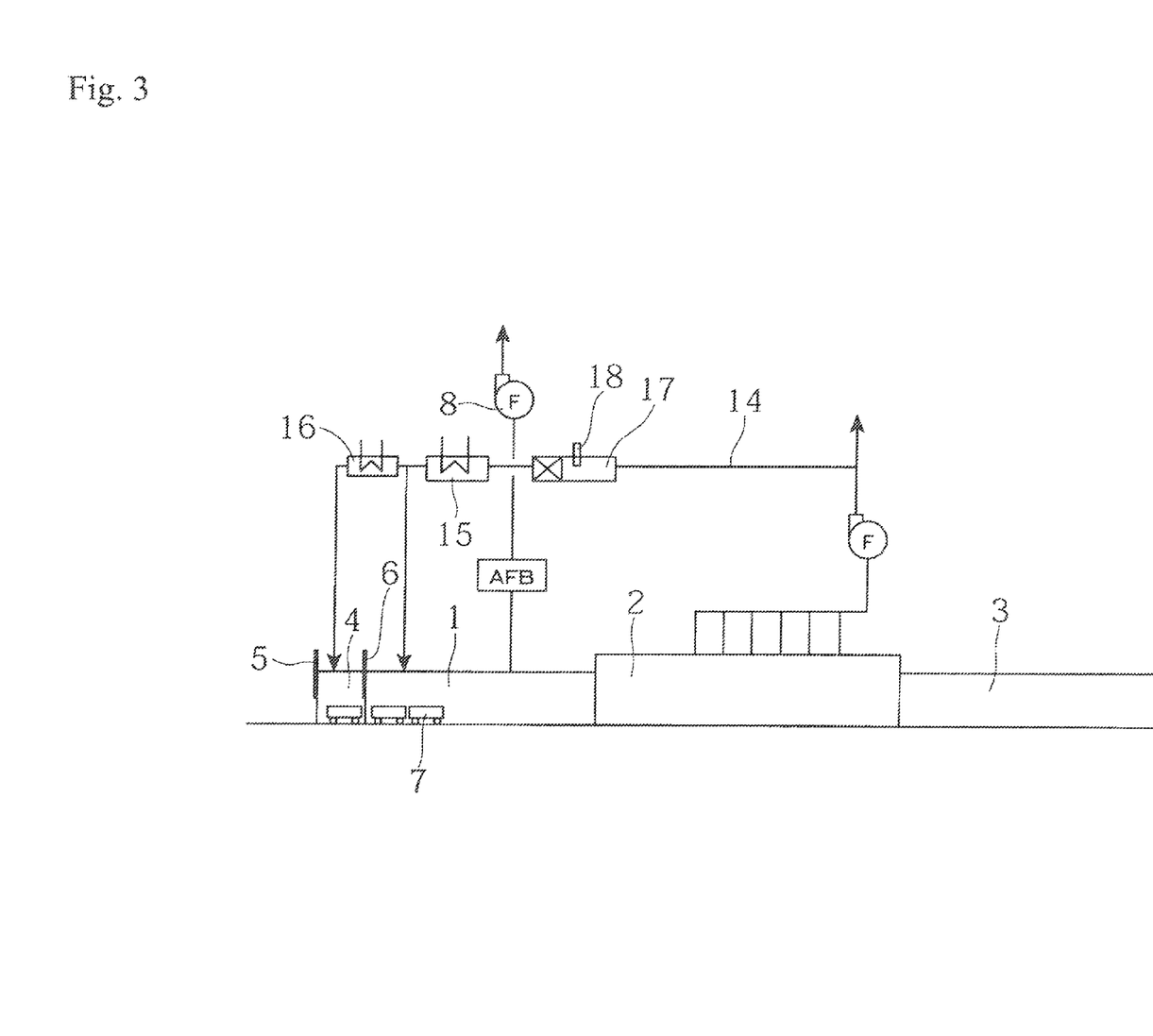
FIG. 3 is an explanatory view of a second embodiment of the invention.

FIG. 3 is an explanatory view of a second embodiment of the invention. In the first embodiment shown in FIG. 1, exhaust gas from the heat storage regenerative burners 10 placed in the firing zone 2 are cooled by the heat removal equipment 15 and 16 to be supplied to the preheating zone 1 and the spare chamber 4 without adjusting its oxygen concentration. However, the oxygen concentration may exceed the preferable value of 8% or the desired value of 5% depending on the operating condition of the heat storage regenerative burners 10.

To solve the problem, in the second embodiment, the exhaust gas return line 14 is provided with the combustion device 17 which consumes oxygen contained in exhaust gas to reduce its oxygen concentration. Since almost no combustible components are contained in the exhaust gas from the heat storage regenerative burners 10, fuel gas is supplied from a fuel gas supply pipe 18 into the exhaust gas and burned to consume oxygen contained in the exhaust gas. In the present embodiment, the combustion device 17 serves as a catalytic combustion device and provides catalytic combustion of the fuel gas. The catalytic combustion device is made up of, for example, a ceramic honeycomb structure supporting a precious-metal oxidation catalyst such as platinum or palladium and, therefore, can burn the fuel gas even in a region where the oxygen concentration is low. This way the oxygen concentration in the exhaust gas from the heat storage regenerative burners 10 can be reduced to 8% or less, or preferably 5% or less. Since the exhaust gas is at a temperature of 250° C. to 300° C. as described above, there is not a significant difficulty in proceeding with the catalytic reaction. However, if the temperature lowers below 250° C., it is preferable to place a combustion device to a stage preceding the catalytic combustion device or raise the temperature about 300° C. by adjusting the operating conditions of the heat storage regenerative burners 10 in the firing zone 2. The combustion device 17 in the invention is not particularly limited to a catalytic combustion device but can be, for example, an ordinary direct heating furnace.

At the furnace entrance of the tunnel kiln, an in-furnace atmosphere communicates with fresh air via a space below the carriage. Therefore, it is desired to prevent the fresh air from flowing into the preheating zone 1 via the space or the low-oxygen-concentration exhaust gas supplied to the preheating zone 1 from flowing out via the space below the carriage.

Figure 4:
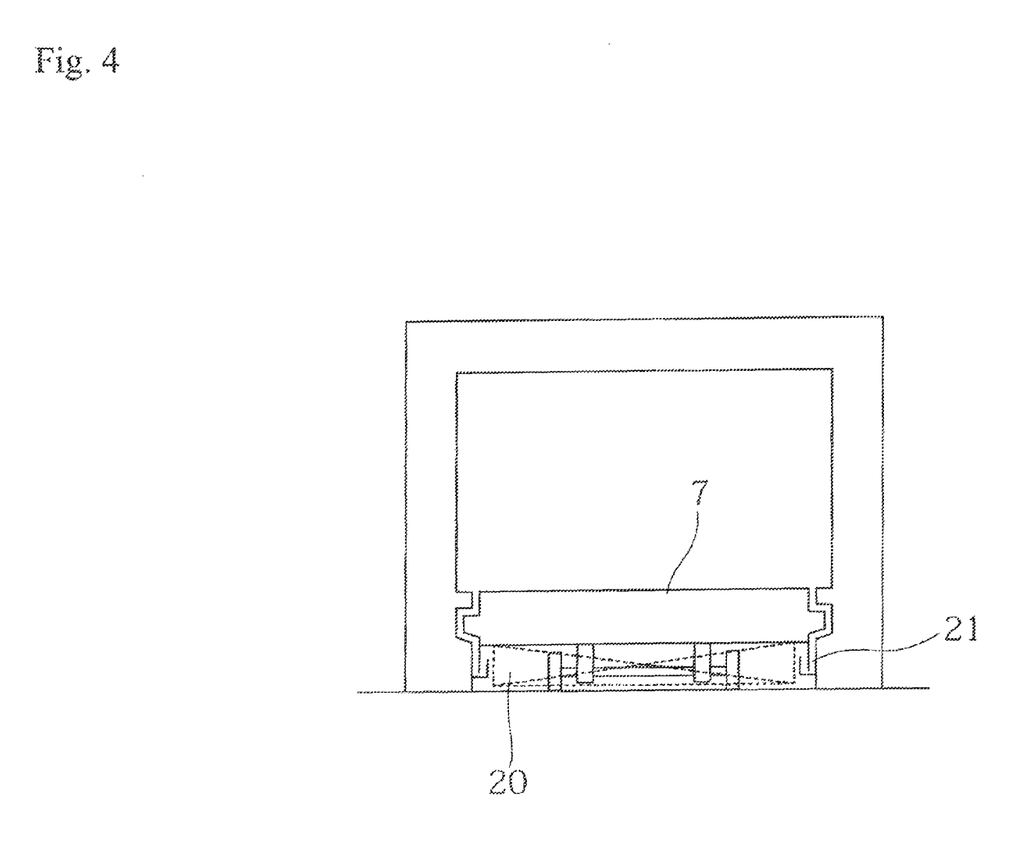
FIG. 4 is an explanatory view of a seal mechanism of carriage.
Figure 5:
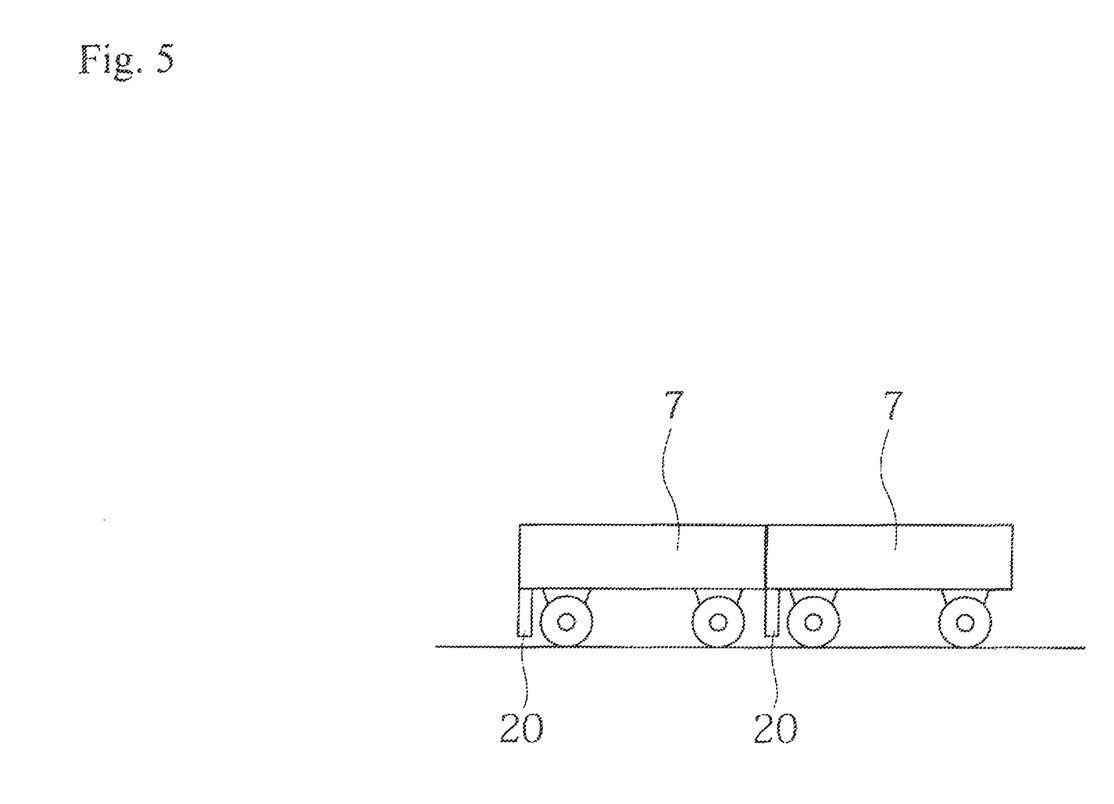
FIG. 5 is an explanatory view of a seal mechanism of carriage.

For this purpose, it is preferable to mount a board 20 such as shown in FIGS. 4 and 5 on the front or rear surface of the carriage 7 in its traveling direction in order to divide the space longitudinally below the carriage so that the exhaust gas may be prevented from flowing into the space below the carriage based on the labyrinth seal principle. Further, of course, both sides of the carriage 7 are shielded from the fresh air by a sand seal 21 as in conventional methods.

As described hereinabove, according to the invention, by supplying exhaust gas from the heat storage regenerative burners 10 placed in the firing zone 2 into the preheating zone 1, it is possible to reduce the oxygen concentration in the heating zone 1 without using nitrogen gas, inhibit combustion of organic binders in the binder releasing process so that breaks due to a temperature difference between the inside and the outside of ceramic porous bodies may be prevented from occurring. It is, therefore, possible to increase the rate of temperature rise as compared with conventional methods so that the binder releasing process may be accelerated to improve productivity. In addition, the total length the tunnel kiln can be reduced to decrease the running costs greatly.

In a case where the means to heat the firing zone 2 is an ordinary burner, the resultant exhaust gas is at a very high temperature and, therefore, needs to be cooled to an allowable temperature limit of the duct by introducing fresh air. If the fresh air is introduced, the oxygen concentration rises. Therefore, even if the gas is returned to the preheating zone 1, effects by the invention cannot easily be obtained. Further, to cool the hot exhaust gas without introducing the fresh air, large-scale heat removal equipment is necessary, which is impracticable industrially.

DESCRIPTION OF REFERENCE NUMERALS

1 Preheating zone
2 Firing zone
3 Cooling zone
4 Spare chamber
5 Rise and fall door
6 Rise and fall door
7 Carriage
8 Suction fan
9 Afterburner
10 Heat storage regenerative burner
11 Heat reservoir
12 Air switching valve
13 Fuel switching valve
14 Exhaust gas return line
15 Heat removal equipment
16 Heat removal equipment
17 Combustion device
18 Fuel gas supply pipe
19 Combustion device
20 Board
21 Sand seal
22 Exhaust line

The invention claimed is:

1. A tunnel kiln for firing ceramic porous bodies, the kiln comprising a preheating zone, a firing zone, and a cooling zone and driving a carriage loaded with ceramic porous bodies through the tunnel kiln, wherein the preheating zone is set to a low-oxygen atmosphere by providing an exhaust gas return line that supplies, into the preheating zone, low-oxygen-concentration exhaust gas discharged from a heat storage regenerative burner employed as means for heating the firing zone, wherein the heat storage regenerative burner alternates between combustion and exhaust of gas from the firing zone such that heat from said gas is stored in a heat reservoir when exhausting said gas, and wherein the preheating zone has an oxygen concentration of 8% or less.

2. The tunnel kiln according to claim 1, wherein a spare chamber is formed at a stage preceding the preheating zone so that the low-oxygen-concentration exhaust gas discharged from the heat storage regenerative burner may be supplied also into the spare chamber.

3. The tunnel kiln according to claim 1, wherein the exhaust gas return line is provided with a combustion device that reduces an oxygen concentration by consuming oxygen contained in the exhaust gas.

4. The tunnel kiln according to claim 1, comprising an exhaust line which suctions in-kiln gas from the preheating zone and meets the exhaust gas return line, wherein the exhaust line is provided with a combustion device that consumes oxygen contained in the in-kiln gas in the preheating zone to lower the oxygen concentration.

5. The tunnel kiln according to claim 3, comprising a path which suctions the in-kiln gas from the preheating zone and meets a stage preceding the combustion device.

6. The tunnel kiln according to claim 3, wherein the combustion device is a catalytic combustion device.

7. The tunnel kiln according to claim 1, comprising an afterburner fitted to a path that suctions the in-kiln gas from the preheating zone and discharges it in order to completely burn organic binder gas generating from the ceramic porous bodies and, at the same time, remove nitrogen oxide contained in the exhaust gas supplied from the exhaust gas return line.

8. The tunnel kiln according to claim 2, wherein the exhaust gas return line is provided with a combustion device that reduces an oxygen concentration by consuming oxygen contained in the exhaust gas.

9. The tunnel kiln according to claim 2, comprising an exhaust line which suctions in-kiln gas from the preheating zone and meets the exhaust gas return line, wherein the exhaust line is provided with a combustion device that consumes oxygen contained in the in-kiln gas in the preheating zone to lower the oxygen concentration.

10. The tunnel kiln according to claim 4, wherein the combustion device is a catalytic combustion device.

11. The tunnel kiln according to claim 1, wherein the preheating zone has an oxygen concentration of 5% or less.

12. The tunnel kiln according to claim 1, wherein the exhaust gas discharged from the heat storage regenerative burner passes through a heat exchanger fitted to the exhaust gas return line before being supplied into the preheating zone.

* * * * *